(12) United States Patent
Peter

(10) Patent No.: US 8,149,132 B2
(45) Date of Patent: Apr. 3, 2012

(54) SYSTEM AND METHOD FOR HARD LINE COMMUNICATION WITH MWD/LWD

(75) Inventor: Andreas Peter, Niedersachsen (DE)

(73) Assignee: Baker Hughes Incorporated, Houston, TX (US)

( * ) Notice: Subject to any disclaimer, the term of this patent is extended or adjusted under 35 U.S.C. 154(b) by 1335 days.

(21) Appl. No.: 11/759,553

(22) Filed: Jun. 7, 2007

(65) Prior Publication Data

US 2008/0000689 A1    Jan. 3, 2008

Related U.S. Application Data

(60) Provisional application No. 60/817,921, filed on Jun. 30, 2006.

(51) Int. Cl.
*G01V 3/00* (2006.01)

(52) U.S. Cl. ............... 340/855.1; 340/854.9; 340/855.2; 175/309; 175/314

(58) Field of Classification Search ............... 340/854.9, 340/855.1, 855.2; 175/309, 314
See application file for complete search history.

(56) References Cited

U.S. PATENT DOCUMENTS

| | | | | |
|---|---|---|---|---|
| 3,825,078 A | * | 7/1974 | Heilhecker et al. | 175/57 |
| 3,913,688 A | * | 10/1975 | Heilhecker et al. | 340/855.1 |
| 4,153,120 A | * | 5/1979 | Zuvela et al. | 175/57 |
| 4,271,908 A | * | 6/1981 | Robinson et al. | 166/385 |
| 4,325,438 A | | 4/1982 | Zuvela | |
| 4,495,073 A | | 1/1985 | Beimgraben | |
| 4,792,802 A | * | 12/1988 | Meadows | 340/855.1 |
| 5,294,923 A | | 3/1994 | Juergens et al. | |
| 6,041,872 A | * | 3/2000 | Holcomb | 175/40 |
| 6,655,453 B2 | * | 12/2003 | Head | 166/77.1 |
| 7,350,589 B2 | * | 4/2008 | Head | 166/385 |
| 2006/0065444 A1 | | 3/2006 | Hall et al. | |
| 2008/0000689 A1 | * | 1/2008 | Peter | 175/40 |

FOREIGN PATENT DOCUMENTS

| | | |
|---|---|---|
| EP | 0526294 B1 | 3/1996 |
| GB | 2370590 A | 7/2002 |
| WO | WO 2008005192 A2 * | 1/2008 |

OTHER PUBLICATIONS

PCT International Search Report. No. PCT/US2007/014453. Mailed May 16, 2008. 13 pages.

* cited by examiner

*Primary Examiner* — Jennifer H Gay

(74) *Attorney, Agent, or Firm* — Cantor Colburn LLP

(57) ABSTRACT

A MWD/LWD hard line communication system and method includes for the system a cartridge capable of deploying wire in a borehole, a screen attachable to the cartridge and positionally retainable in the borehole, and a communications connector operably associable with the cartridge; and for the method, deploying hardline from a cartridge, attaching the cartridge to a screen, and attaching the cartridge to a communications connector. Another method includes pumping fluid downhole, urging a wire nest into a screen, and compacting the nest into the screen with the fluid until the fluid is pumpable past the nest through an unobstructed portion of the screen.

20 Claims, 2 Drawing Sheets

SYSTEM AND METHOD FOR HARD LINE COMMUNICATION WITH MWD/LWD

CROSS REFERENCE

The present application claims priority to U.S. Provisional Patent Application Ser. No. 60/817,921, filed Jun. 30, 2006, the entire contents of which are specifically incorporated herein by reference.

BACKGROUND

Measurement while drilling (MWD) and logging while drilling (LWD) using hard lines is often problematic in the wellbore environment. While such lines provide for a much better data rate, than other methods currently employed, they present easy targets for well equipment. When a line is impacted or otherwise strained beyond its tolerance level, it will, of course, break. This presents two problems: the first and obvious problem is that data flow has stopped on at least that line; and the second and potentially even more damaging problem, is that broken lines get pumped downhole along with mud in the column. This often results in the line creating somewhat of a "rat nest" or a "wire nest". Wire nests are a problem in that they can impede fluid flow, potentially forming a plug of sorts. Once the tubing has a plug, pressure of the mud tends to move the plug downhole until it hits something solid doing damage thereto and potentially causing a complete stop of fluid flow. At this point, well operations associated with the MWD/LWD process are prevented from occurring. Other well operations may also be affected at this point, but almost certainly will be during the consequently required intervention and fishing operation to correct the problem.

Wireless means for communicating MWD/LWD data such as acoustic or mud pulse telemetry exist and do function without the risks associated with a hard line but the data rates are quite slow thereby rendering the methods unsuitable for some applications.

A system and method for facilitating the use of a hard line communication with its inherently higher data rate while reducing the risks associated therewith would be well received by the art.

SUMMARY

Disclosed herein is a MWD/LWD hard communication line system. The system includes a cartridge capable of deploying wire in a borehole, a screen attachable to the cartridge and positionally retainable in the borehole, and a communications connector operably associable with the cartridge.

Further disclosed herein is a method for employing a hard line for a MWD/LWD operation. The method includes deploying hardline from a cartridge, attaching the cartridge to a screen, and attaching the cartridge to a communications connector.

Yet further disclosed herein is a method for reducing damage and promoting continued operations after a hard line break causes a nest in a MWD/LWD operation. The method includes pumping fluid downhole, urging the nest into a screen, and compacting the nest into the screen with the fluid until the fluid is pumpable past the nest through an unobstructed portion of the screen.

BRIEF DESCRIPTION OF THE DRAWINGS

Referring now to the drawings wherein like elements are numbered alike in the several figures.

DETAILED DESCRIPTION

Figure 1:
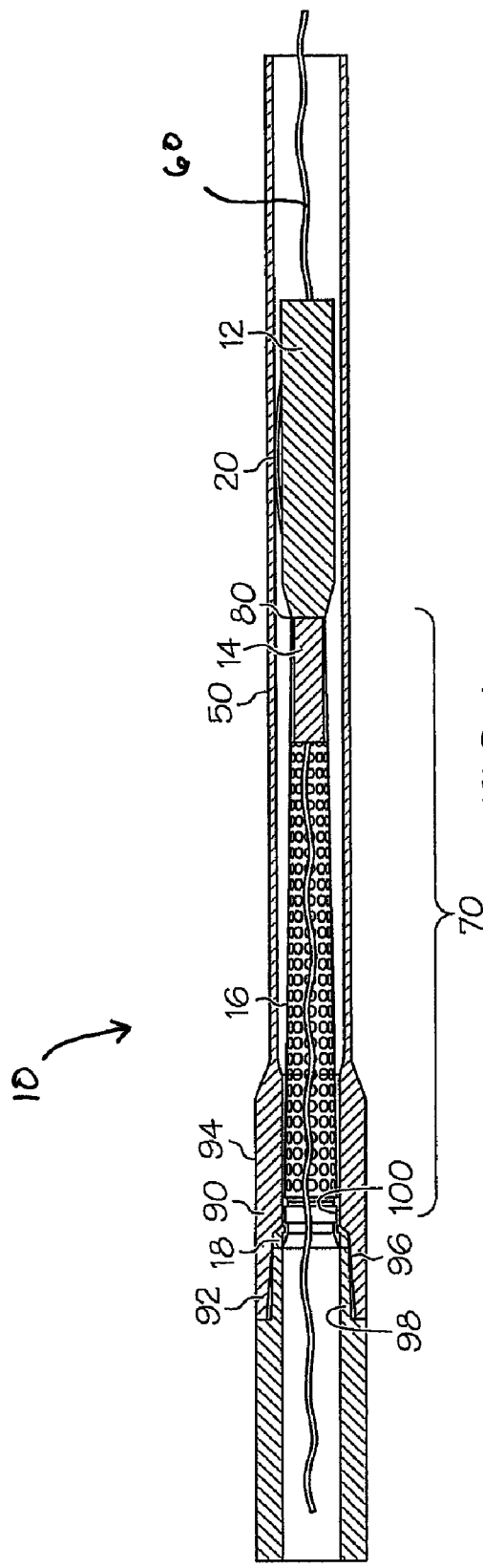
FIG. 1 is a cross-sectional view of a portion of a tubing string containing one operational unit of a hard communication line system for MWD/LWD tools.

Referring to FIG. 1, illustrated is an operable unit 10 of the system for utilizing hard lines with MWD/LWD tools. The unit 10, of which there may be one or more in a particular system, comprises a cartridge 12 at a downhole end thereof, a releasable communications connector 14 in operable communication therewith (when connected as illustrated), and a mud screen 16 that is coaxially disposed about the connector 14 and affixed to cartridge 12 at an uphole end thereof. The cartridge further includes a position retention feature such as, for example, a bow spring 20 as illustrated.

The mud screen includes a plurality of openings, such as holes or slots therein dimensioned to disallow passage of a nested wire therethrough to ensure that a broken wire does not get circulated downhole past the screen where it can do damage or bring an untimely end to wellbore operations. The exact size of the holes will depend upon the cross-sectional dimensions of the wire itself versus a desire to maximize fluid flow therethrough. It is well within the skill of one of ordinary skill in the art to determine what hole size to use for a particular application. In one embodiment, the screen is frusto-conical in shape to enhance the flow area outside an area within the screen to which a wire nest is pumped. The mud screen 16 further includes a releasable shoulder ring 18 and an internal fishing neck 100. Further detail and operational interaction are provided hereunder.

A fact of running suspended hard lines in a wellbore is that the material of construction of the line along with its cross sectional area are mathematically correlatable to a maximum length of suspension before inevitable breakage simply due to the lines' own weight. Friction between the line and the flowing drilling fluid creates another, even stronger tensile load in the line. For these reasons, several lengths of line are often necessary to reach from a surface or other remote location to the location of the MWD/LWD tool but communicatively connected by the line to resolve this issue. The terms line, hard line or wire as referred to herein are generically used to refer to copper or other electronically conductive line, optic fiber line, or any other line effective for propagation of a signal of communicative or power transfer reasons.

Cartridge 12, as noted above, includes a position retention feature 20. This feature is useful in both temporarily maintaining position of the cartridge 12 relative to tubing 50, while tubing is being added at surface for continued drilling operations and assisting in retaining the cartridge 12 relative to the tubing after a lower wire segment 60 has been deployed. As each tube 50 is attached to the one going into the hole before it, the cartridge 12 is drawn uphole in, for example, 30 feet increments (length of drill pipe segments) a number of times, until all of the wire stored therein is deployed (about 1000 ft.) After all wire is deployed, the cartridge requires semi-permanent position retention for its trip downhole with the rest of the drill string.

Still referring to FIG. 1, bracket 70 identifies components added to an uphole end of cartridge 12 to facilitate both semi-permanent position retention and other benefits of the arrangement disclosed herein. The other benefits are addressed infra. At an interface 80 a makeable connection profile is provided to attach cartridge 12 to mud screen 16. This may be an annular threaded connection, a series of bolts or pins, a welded connection, etc. The interface should be relatively easily made up at the rotary table and be stable. This connection is not intended to be releasable. In addition to this physical connection at the interface 80, it is further required to provide for electrical connection between an uphole end of cartridge 12 (which of course is already electronically connected to the wire it deployed earlier) and the upper wire section, which will be deployed next. This electrical connection is a part of connector 14. The connection itself should be easy to makeup at a rotary table on a rig (not shown) and will provide defeatably permanent electrical interconnection between a more uphole wire that will be deployed from a next adjacent cartridge (not shown) and the illustrated cartridge 12. In one embodiment, electrical connection may be by blade connection, pin connection, etc. The mechanical connection of the connector 14 to the cartridge 12 is to be a releasable one. In one embodiment the connection utilizes one or more shear screws, or shear pins. Alternatively, a collet type mechanism might be substituted. It is important that the connection be strong enough to resist release from the pull of the wire connected thereto as the next upper cartridge is pulled uphole during deployment of the wire spooled thereon. Further, it is important that the mechanical connection be sufficiently releaseable that the electrical connector 14 will disengage from cartridge 12 at a tensile load less than a tensile limit of the wire attached thereto from above. Ensuring the stated properties of connection allows an operator to prepare for pulling of the system without wire becoming an impediment by allowing a pull on the wire to cause a disconnection, which then allows the consequently loose wire to be reeled back to a remote location or the surface.

Finally, with respect to anchoring the cartridge 12 in position, the mud screen 16 includes a shoulder ring 18 at an uphole end thereof that is configured and dimensioned to be receivable in a boreback section 90 of a box thread 92 at an uphole end 94 of a section of drill pipe 50. Shoulder ring 18 nests in boreback section 90 and is retained therein by a leading edge 96 of thread 98 of the next uphole pipe section.

Shoulder ring 18 is releaseably connected to screen 16 so that upon a selected tensile load thereon, the screen 16 will release from shoulder ring 18, leaving the ring in place while the screen 16 and attached cartridge 12 become mobile for retrieval to a remote location, such as a surface location. Both the initial tensile load applied and the impetus to retrieve the screen and cartridge are imposed through an internal fishing neck 100 in screen 16. Releaseablility may be in form of sheer screws or sheer pins or any other calculatable strength limited connection between the screen and the shoulder ring.

Figure 2:
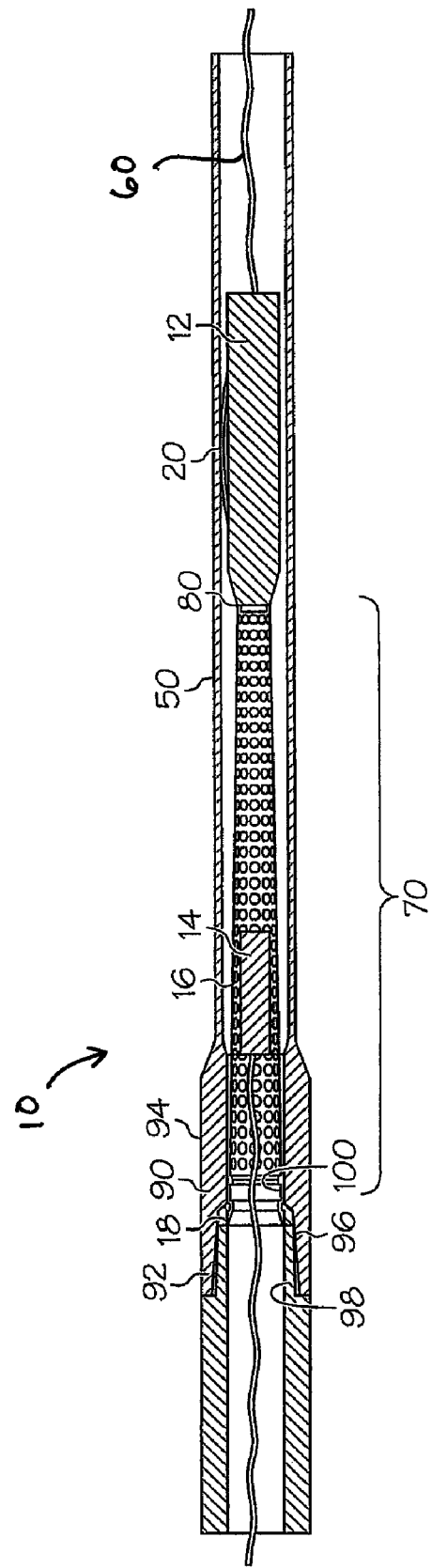
FIG. 2 is a cross-sectional view similar to FIG. 1 where an electrical disconnect has been released to retrieve wire uphole.
Figure 3:
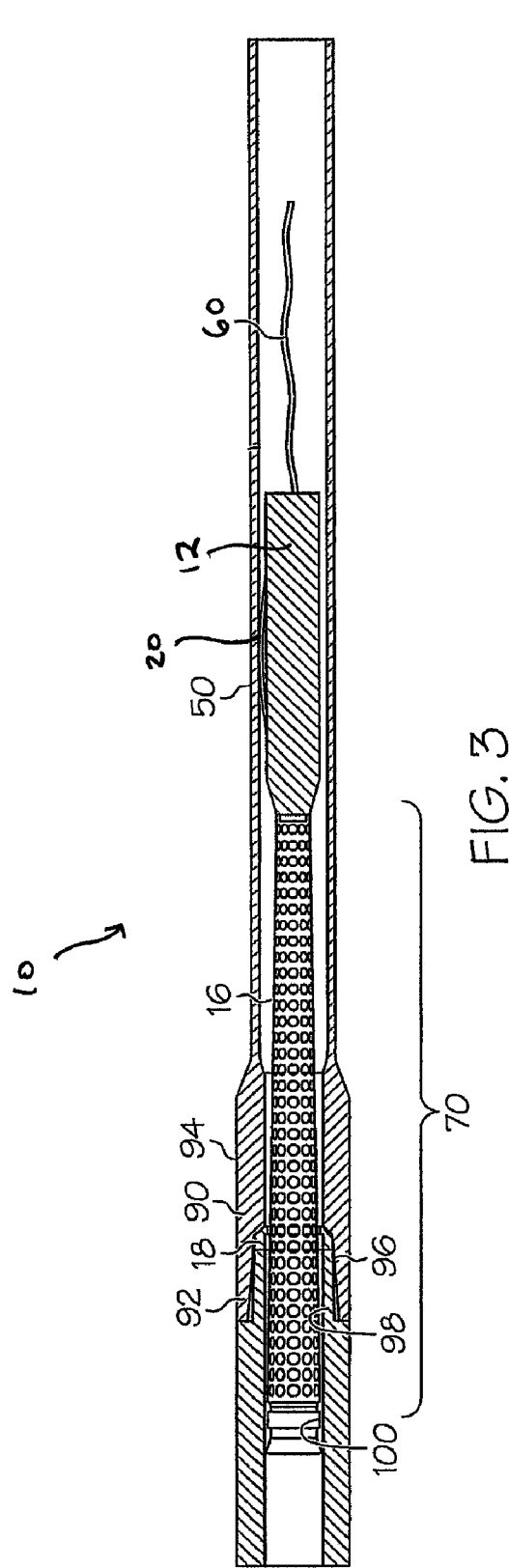
FIG. 3 is a cross-sectional view similar to FIG. 1 where a screen and cartridge of the system is illustrated pulled out of its shoulder ring for retrieval to surface.

Referring to FIG. 2, a disconnected electrical connector 14 is illustrated still within the screen 16 while being drawn to a remote location, which in the illustration is an uphole location such as a surface location. Referring to FIG. 3, the screen is illustrated released from the shoulder ring 18 and the screen and cartridge partially withdrawn from their previous positions.

In operation, the cartridge 12 is manipulated to deploy wire to an advancing Bottom Hole Assembly (BHA) (not shown) in the manner noted above until a selected amount of the wire is deployed. Coupling of the next adjacent wire segment and screen follows as noted and a new deployment operation ensues with a new cartridge. This process is repeated until the BHA is at desired depth.

When it is desired to pull the string out of the wellbore, a first pull on the last cartridge will cause release of the electrical connector 14 thereby allowing the wire to be pulled and in one embodiment, spooled at surface. Following removal of the wire, either the drillstring is disassembled including removing the next lower screen and cartridge assembly as they come to surface, which removal itself will create the tensile force necessary to release the next lower connector 14, and so on; or if the drillstring is to remain intact but obstructions must be removed, a fishing tool with appropriate end (not shown) to engage the internal fishing neck 100 is run to pull the screen and next cartridge by releasing the shoulder ring (it is noted that the shoulder ring need not be separated if the drillstring is being disassembled but only if the drillstring is to remain intact. The screen and cartridge can then be removed from the well while at the same time providing a pull on the next lower wire to disconnect electrical connector 14 for the next lower assembly. The process repeats until all assemblies are removed from the well leaving the drill string in place for whatever task might be desired of it, or to run other tools through the string, for example, a free-point indicator tool.

Figure 4:
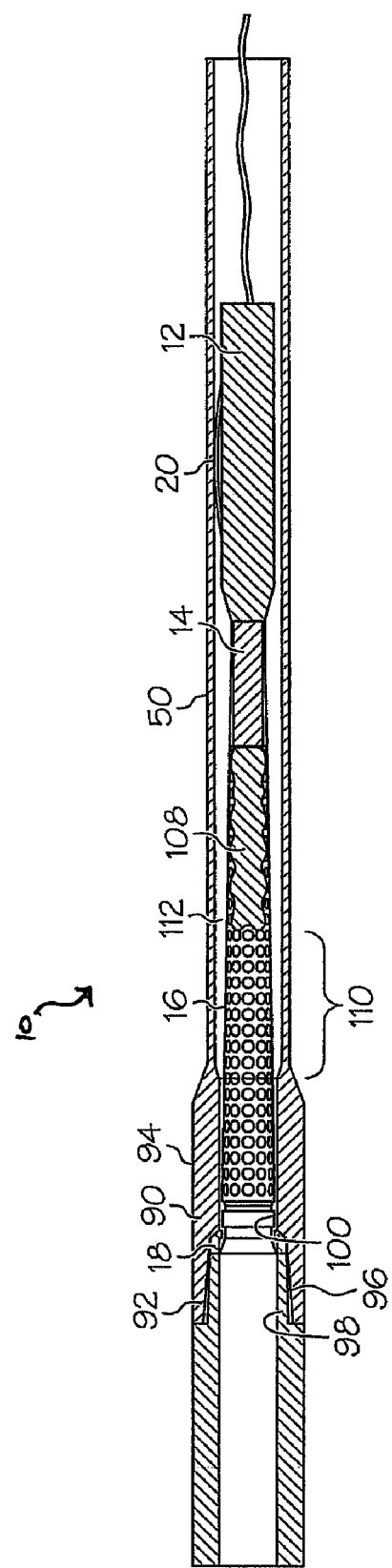
FIG. 4 is a schematic cross-sectional view of a wire nest having formed in the screen to illustrate remaining flow path in the system.

A significant benefit of the herein described arrangement is that a wire break at any time during use of the system does not pose the same risks of a wire nest plug that has been the case with the prior art. When a wire breaks in the system described herein, it will fall into or be circulated into the next lower screen 16 in the system where it is compressed by circulating fluid until the pressure head above the wire nest 108 is relieved due to the wire being forced far enough into the mud screen 16 to allow circulation to resume through the screen above the nest. This is illustrated in FIG. 4. Referring to FIG. 4, numeral 110 identifies a bracketed area of the system where mud flowing into screen 16 can flow radially outwardly to an annular region 112 and thence downhole.

Because of the ability of the system to absorb a wire break without loss of the ability to circulate and consequential shut down of the operation, the use of hard wire with it's inherently higher data rate is much more desirable.

While preferred embodiments have been shown and described, modifications and substitutions may be made thereto without departing from the spirit and scope of the invention. Accordingly, it is to be understood that the present invention has been described by way of illustrations and not limitation

The invention claimed is:

1. A MWD/LWD hard communication line system comprising:
 a detachable spool, capable of deploying a first wire segment in a borehole downhole relative to the detachable spool;
 a screen positioned uphole relative to the detachable spool in the borehole and including a side wall that surrounds a second wire segment, the second wire segment extending uphole relative to the detachable spool, the side wall having a plurality of openings extending therethrough; and
 a communications connector operably connected to the detachable spool and the second wire segment.

2. The MWD/LWD hard communication line system of claim 1, further comprising a shoulder ring surrounding one end of the screen and releasably associated with the screen.

3. The MWD/LWD hard communication line system of claim 2 further comprising a drill pipe between the screen and a wall of the borehole,
 wherein the shoulder ring is dimensioned and configured to be positionally retained in a portion of the drill pipe.

4. The MWD/LWD hard communication line system of claim 3 wherein the portion of the drill pipe is a boreback section of the drill pipe.

5. The MWD/LWD hard communication line system of claim 2 wherein the shoulder ring is releasable via a release member.

6. The MWD/LWD hard communication line system of claim 5 wherein the release member is a sheer member.

7. The MWD/LWD hard communication line system of claim 1 wherein the screen is frustoconical in shape.

8. The MWD/LWD hard communication line system of claim 1 wherein the screen includes a hollow portion defined by the side wall having the plurality of openings therein, the plurality of openings having dimensions configured to prevent passage therethrough of a portion of the second wire that forms a wire nest.

9. The MWD/LWD hard communication line system of claim 1 wherein the communications connector is an electrical connector.

10. The MWD/LWD hard communication line system of claim 1 wherein the communications connector is a fiber optic connector.

11. The MWD/LWD hard communication line system of claim 1 wherein the communications connector is releasable from the detachable spool upon application of a tensile load.

12. The MWD/LWD hard communication line system of claim 11 wherein the tensile load is greater than the tensile load occasioned by deployment of wire connected to the communications connector.

13. The MWD/LWD hard communication line system of claim 11 wherein the tensile load is less than a tensile limit of the line itself.

14. The MWD/LWD hard communication line system of claim 1 wherein the detachable spool includes a position retention arrangement.

15. A method for employing a hard line for a MWD/LWD operation comprising:
 deploying a first hard line segment from a cartridge positioned downhole relative to a screen; and
 attaching the cartridge to a communications connector, the communications connector connected to a second hard line segment extending uphole relative to the cartridge through the screen, the screen including a sidewall that surrounds the second hard line segment, the sidewall having a plurality of openings extending therethrough.

16. The method for employing a hard line for a MWD/LWD operation as claimed in claim 15, further comprising releasing the communications connector from the cartridge to reel the second hard line segment uphole relative to the cartridge.

17. The method for employing a hard line for a MWD/LWD operation of claim 15 further comprising attaching the cartridge to the screen.

18. A method for reducing damage and promoting continued operations after a hard line break causes a nest in a MWD/LWD operation comprising:
 pumping fluid downhole;
 urging the nest into a screen; and
 compacting the nest into the screen with the fluid until the fluid is pumpable past the nest through an unobstructed portion of the screen.

19. The MWD/LWD hard communication line system of claim 1 wherein the detachable spool is disposed within a cartridge.

20. The MWD/LWD hard communication line system of claim 1 wherein the screen is attachable to the detachable spool.

* * * * *